A. F. ELKINS & H. HUNTER.

SAFETY APPLIANCE FOR MOVING PICTURE APPARATUS.

APPLICATION FILED JAN. 3, 1908.

12,853. Reissued Sept. 15, 1908.

Witnesses

W. A. Woodson

Inventors

Arthur F. Elkins

Henry Hunter

By Chas. B. Racey, Attorneys

UNITED STATES PATENT OFFICE.

ARTHUR F. ELKINS AND HENRY HUNTER, OF IRONTON, OHIO, ASSIGNORS OF ONE-FOURTH TO FRANK L. McCAULEY AND ONE-FOURTH TO THOMAS J. KENNEDY, OF IRONTON, OHIO.

SAFETY APPLIANCE FOR MOVING-PICTURE APPARATUS.

No. 12,853. Specification of Reissued Letters Patent. Reissued Sept. 15, 1908.

Original No. 861,169, dated July 23, 1907, Serial No. 366,803. Application for reissue filed January 3, 1908. Serial No. 409,244.

*To all whom it may concern:*

Be it known that we, ARTHUR F. ELKINS and HENRY HUNTER, citizens of the United States, residing at Ironton, in the county of Lawrence and State of Ohio, have invented certain new and useful Improvements in Safety Appliances for Moving-Picture Apparatus, of which the following is a specification.

This invention relates to that type of moving picture apparatus employing some light projecting means and a film through which the rays of light from the light projecting means pass. It is well known that, owing to the combustible nature of the substance out of which the film of this character is formed, the heat of the rays of light projected from the lamp or hood of the lantern frequently causes the film to ignite and explode, not only destroying the film, but causing uneasiness in the place of entertainment or the like where these apparatus are generally used.

Our invention has for its primary object improved means for protecting the inflammable film from the heat generated by the light rays from the light projecting means, and to this end the invention consists, essentially, of a cell of water or the like embodying a reservoir or tank and a holder therefor, both constructed and supported independently of the light projecting means and film and arranged to be supported between the two, so that as the rays of light pass through the water cell, the heat rays will be absorbed to a very large extent and thereby protect the film from igniting and exploding. And the invention further consists in certain constructions, arrangements and combinations of the parts that we will hereinafter fully describe and then point out the novel features in the appended claims.

In the accompanying drawing has been illustrated a simple and preferred form of the invention, but it is to be understood that no limitation is necessarily made to the precise structural details therein exhibited, and that changes, alterations, and modifications may be resorted to when desired, within the scope of the invention, as defined by the appended claims.

Figure 1:
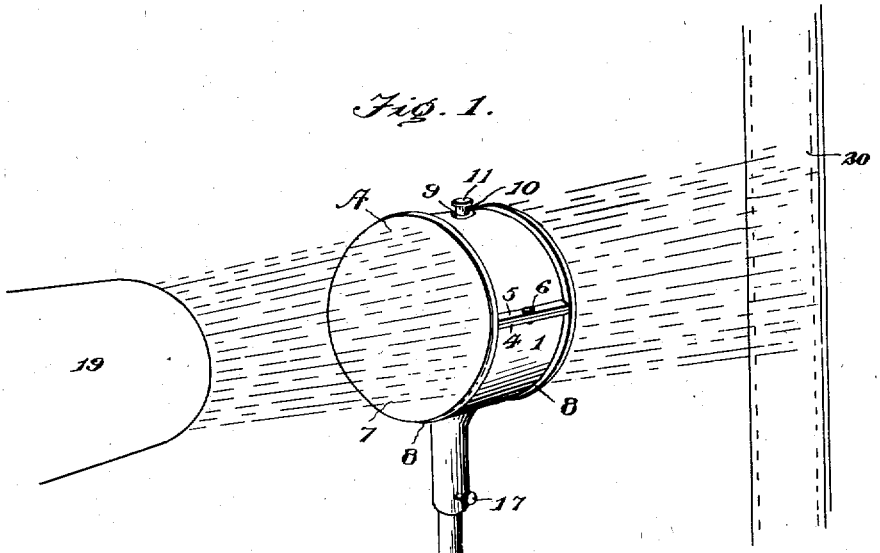
Figure 2:
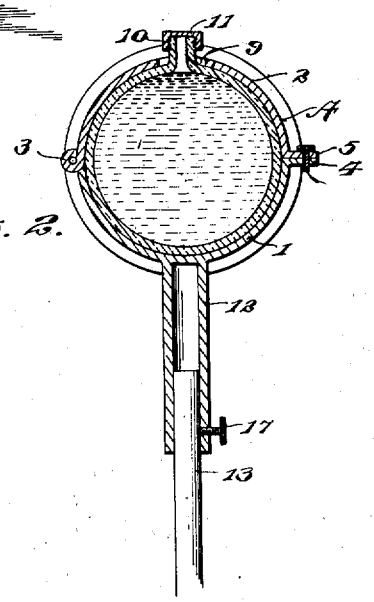

In the drawing: Figure 1 is a perspective view illustrating one form or embodiment of our invention interposed between the light projecting means and film of a kinetoscope or moving picture apparatus; and Fig. 2 is a vertical transverse sectional view through the safety appliance, a portion of the supporting device for the water cell being broken away or omitted.

Corresponding and like parts are referred to in the following description and indicated in both figures of the drawing by like characters of reference.

The device of our invention is a structure complete in itself, formed separate from the moving picture apparatus and designed to be installed therewith, and it comprises a reservoir designed to contain water or some other transparent liquid and a holder for said reservoir so that the same may be properly adjusted between the light projecting means and the film of the moving picture apparatus so as to insure the transmission of the light rays through the water cell as they pass to the film.

In the present instance the reservoir 7 is cylindrical and is composed entirely of glass, although obviously, it will be seen that it is only necessary that the ends thereof be transparent. The said reservoir 7 is provided at its ends with flanges 8 (in the embodiment of the invention illustrated in the drawing), said flanges abutting upon the ends of a sleeve or holder A. The holder A is composed of two semi-cylindrical members 1 and 2 that are designed to encircle the reservoir 7 to hold it in place, said members being connected together at one side by a hinge 3 and provided along their opposite edges with the flanges 4 and 5 adapted to be detachably connected by a fastening member, such as a screw 6. Hence, the upper member 2 of the holder may be swung back whenever desired on the hinge 3 and the reservoir 7 removed in order to refill it or for any other desired purpose. The reservoir 7 is provided with a neck 10 constituting a filling aperture, said neck being provided with a closure 11 of any desired formation, and the upper member 2 of the holder is formed with an aperture 9 for the accommodation of said neck.

In order to provide means for holding the water cell, constituted by the filled reservoir 7, in proper adjusted position, irrespective of the exact relative positions of the base to which it may be attached and the light projecting means and film, we have shown in the present instance the lower member 1 of the holder as formed with a downwardly extending tubular shank 12, with which a post 13 telescopes, said post being adjustably mounted within the shank 12 and these two parts being held at the desired vertical extensions by means of a set screw 17 working through the shank and impinging against the post. In order to properly support the water cell in different positions in a horizontal plane between the light projecting means and the film, so as to secure the proper transmission of the light rays through the cell, the post 13 is in the present instance formed at its lower end with an eye 14 by which it may be slipped over and held upon a supporting bracket 15, a set screw 16 working through the eye 14 and impinging against the bracket 15 to secure the post 13 on the bracket at the required adjustment. The supporting bracket 15 is formed at one end with an apertured foot by means of which it may be secured in any desired position by a fastening member, such as a bolt or screw 18.

19 designates any conventional form of light projecting lens holder or hood of the light projecting means, and 20 the moving film.

From the foregoing description in connection with the accompanying drawing, it will be seen that we have provided an improved water cell which may be so disposed between the light projecting means and film of any moving picture apparatus of the ordinary types, in such a position that the rays of light from the light projecting means will be transmitted through the water cell as they pass to the film, the heat rays being thereby absorbed to a very large extent and the film thereby protected from ignition and consequent explosion.

By the construction herein described, the holder A may be very readily adjusted to the proper position, as may be rendered necessary by the varying positions of the lamp or lens holder in the particular apparatus with which our invention is associated.

The device may be readily disassembled and packed for storage or shipment, and the reservoir may be readily detached from the holder for the purpose of renewing the contents of the reservoir or cleaning the same.

Having thus described the invention, what is claimed as new is:

1. A safety appliance for the films of moving picture apparatus, comprising a holder composed of two hingedly connected members, a transparent reservoir mounted in said holder, one of the members of the holder being provided with a downwardly projecting tubular shank, a supporting bracket, and a post secured on said bracket and fitting within the tubular shank, the shank being provided with means for rigidly connecting it to the post.

2. A safety appliance for the films of moving picture apparatus, comprising a tubular holder composed of two hingedly connected members provided with abutting flanges along their free edges, means for securing said flanges together, and a transparent reservoir mounted in the holder and containing a clear transparent liquid.

3. A safety appliance for the films of moving picture apparatus, comprising a holder having a downwardly projecting tubular shank provided with a set screw, a transparent reservoir supported in the holder and containing a clear transparent liquid, a supporting bracket, and a post having an eye engaging said bracket and provided with a set screw, whereby it may be secured adjustably in position upon said bracket, said post engaging the shank of the holder, the set screw of the shank working through the same and serving to secure the shank adjustably upon the post.

In testimony whereof we have signed our names to this specification in the presence of two subscribing witnesses.

ARTHUR F. ELKINS.
HENRY HUNTER.

Witnesses:
S. S. STEUART,
EDITH MAE HENRY.